United States Patent [19]

Touji et al.

[11] Patent Number: 4,811,219

[45] Date of Patent: Mar. 7, 1989

[54] METHOD OF MODIFYING PROGRAMS STORED IN CASH REGISTER

[75] Inventors: Ryozo Touji, Tenri; Souichi Ohnishi, Yao, both of Japan

[73] Assignee: Sharp Kabushiki Kaisha, Osaka, Japan

[21] Appl. No.: 117,907

[22] Filed: Nov. 3, 1987

Related U.S. Application Data

[63] Continuation of Ser. No. 735,212, May 17, 1985, abandoned.

[30] Foreign Application Priority Data

May 17, 1984 [JP] Japan ................................ 59-100207

[51] Int. Cl.⁴ ......................... G06F 15/22; G06F 9/22; C07G 1/12

[52] U.S. Cl. .................................... 364/405; 364/200; 364/900

[58] Field of Search ............... 364/405, 135, 200, 900; 371/10, 19

[56] References Cited

U.S. PATENT DOCUMENTS

| | | | |
|---|---|---|---|
| 4,403,303 | 9/1983 | Howes | 364/900 |
| 4,429,368 | 1/1984 | Kurii | 364/200 |
| 4,554,630 | 11/1985 | Sargent | 371/19 |
| 4,607,332 | 8/1986 | Goldberg | 364/300 |
| 4,688,173 | 8/1987 | Mitarai | 364/405 |

FOREIGN PATENT DOCUMENTS 57-72301 4/1982 Japan .

*Primary Examiner*—Joseph Ruggiero
*Assistant Examiner*—Gail O. Hayes
*Attorney, Agent, or Firm*—Birch, Stewart, Kolasch & Birch

[57] ABSTRACT

An electronic cash register (ECR) comprising a memory containing addresses identical to those of the mask ROM that permanently stores a variety of trade processing programs and stores data indicating whether any change should be applied to such programs stored in those addresses. Other memories are provided for storing the memory bank data memorizing the addresses of the modified programs among such programs stored in the mask ROM and the modified programs and also storing the modified programs themselves. The electronic cash register embodied by the present invention permits the system to easily and securely write and store a variety of data necessary for changing programs stored in the mask ROM in those memories mentioned above via an input provided for inputting and processing a variety of trading data.

2 Claims, 4 Drawing Sheets

FIG. 4
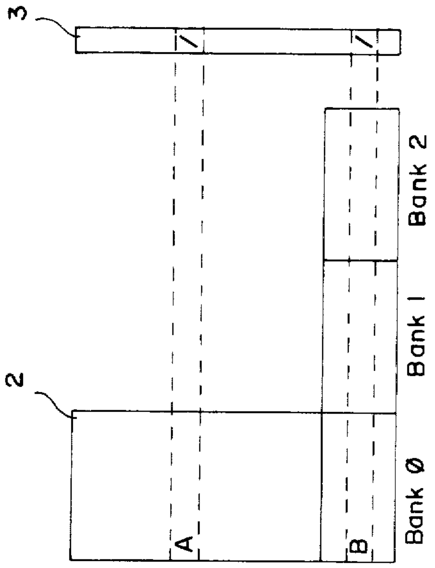
FIG. I
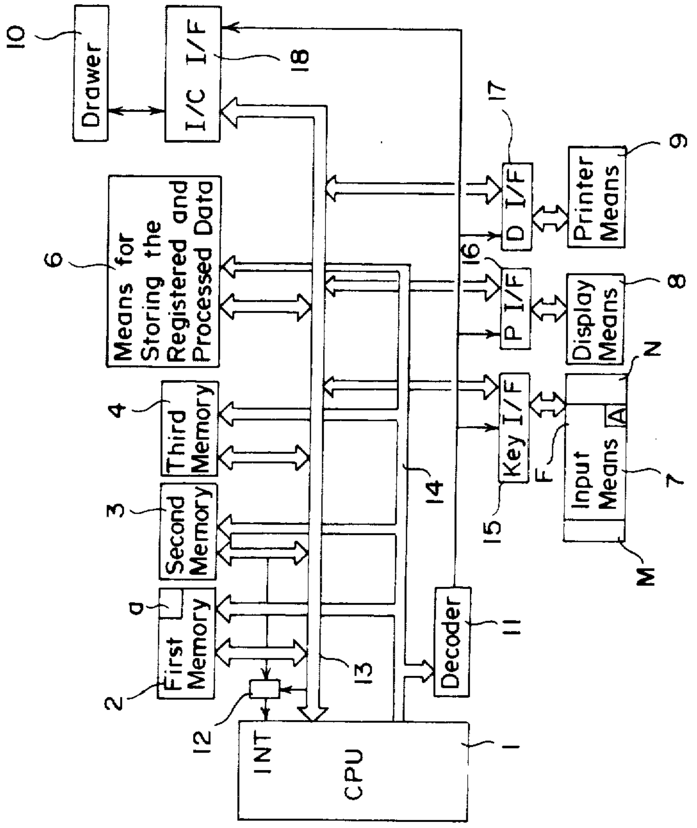

METHOD OF MODIFYING PROGRAMS STORED IN CASH REGISTER

This application is a continuation of application Ser. No. 735,212, filed on May 17, 1985, now abandoned.

BACKGROUND OF THE INVENTION

The present invention relates to an electronic apparatus, such as an electronic cash register (hereinafter called ECR) that registers and processes a variety of trade data, or a "teller machine"- normally used to process bank data. The present invention relates more particularly to the method of modifying programs stored in an ECR. The system simply and easily implements needed changes or modifications of programs related to the processing of a variety of trade data stored in the stationary memory.

In conventional ECRs, a low cost stationary mask ROM (read-only memory) is used to store a variety of programs related to the processing of trade data. However, the programs become stationary after they have been written into the mask ROM. In practice, there are many cases which require that part of the processed program be changed or modified after the processed program is stored in the mask ROM. Since the needed program was already stored, it was necessary to replace the mask ROM with a new one in order to change or modify the contents. As a result, to either change or modify the needed program, it is not only expensive but also time and labor consuming.

In light of the disadvantage described above, (as officially disclosed by Japanese Patent Application No. 72301 of 1982), the inventors proposed an art in conjunction with the method of writing and storing a variety of specific data needed to modify programs stored in an ECR's mask ROM by applying the following memory means; a second memory containing addresses identical to those in the mask ROM which serves primarily as the first memory; a third memory storing the data denoting addresses of the programs that require modification; a fourth memory storing modified programs; and a means for entering and processing a variety of trade data using an ECR's mode-select means of selecting a specific mode without providing the means of writing programs independent of the ECR.

Nevertheless, the proposed system still had disadvantages: to independently store data into the third and fourth memories involved complex operations for writing data including the data for the modified programs. In addition, there was a certain limit to the total volume of the modified programs as restricted by the capacity of the third memory.

OBJECT AND SUMMARY OF THE INVENTION

In light of the disadvantages described above, the present invention aims at providing a new system that simplifies input of modified programs in electronic cash registers.

An electronic cash register incorporating the preferred embodiment of the present invention is provided with the following: the means for selecting any operation mode such as registration, inspection, and precise calculation of accounts; a first memory (for the most part a mask ROM) capable of storing fixed programs processed in a specific operational mode selected by the mode selector; a means for inputting a variety of registered data; a second memory containing addresses identical to those of the first memory and storing the data that indicates whether the processed program should be modified or not; a third memory storing the addresses of the modified program of the first memory, a memory bank storing the modified programs relating to the address of the modified program and storing the modified programs; and a means of providing the second and third memories with a variety of data needed to change or modify the processing program stored in the first memory using the input means described above. The specific mode is selected by the mode selector so that the program stored in the first memory can be modified as required.

By using the system mentioned above and by using the mode selector to select a specific mode, the electronic cash register embodied by the present invention securely receives and stores a variety of data needed to change or modify the programs stored in the mask ROM.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a simplified block diagram of an electronic cash register (ECR) incorporating the preferred embodiments of the present invention;

FIGS. 3 and 4 are respectively the charts denoting the data storage status of RAMs 3 and 4.

DETAILED DESCRIPTION OF THE PREFERRED EMBODIMENTS

Figure 2:
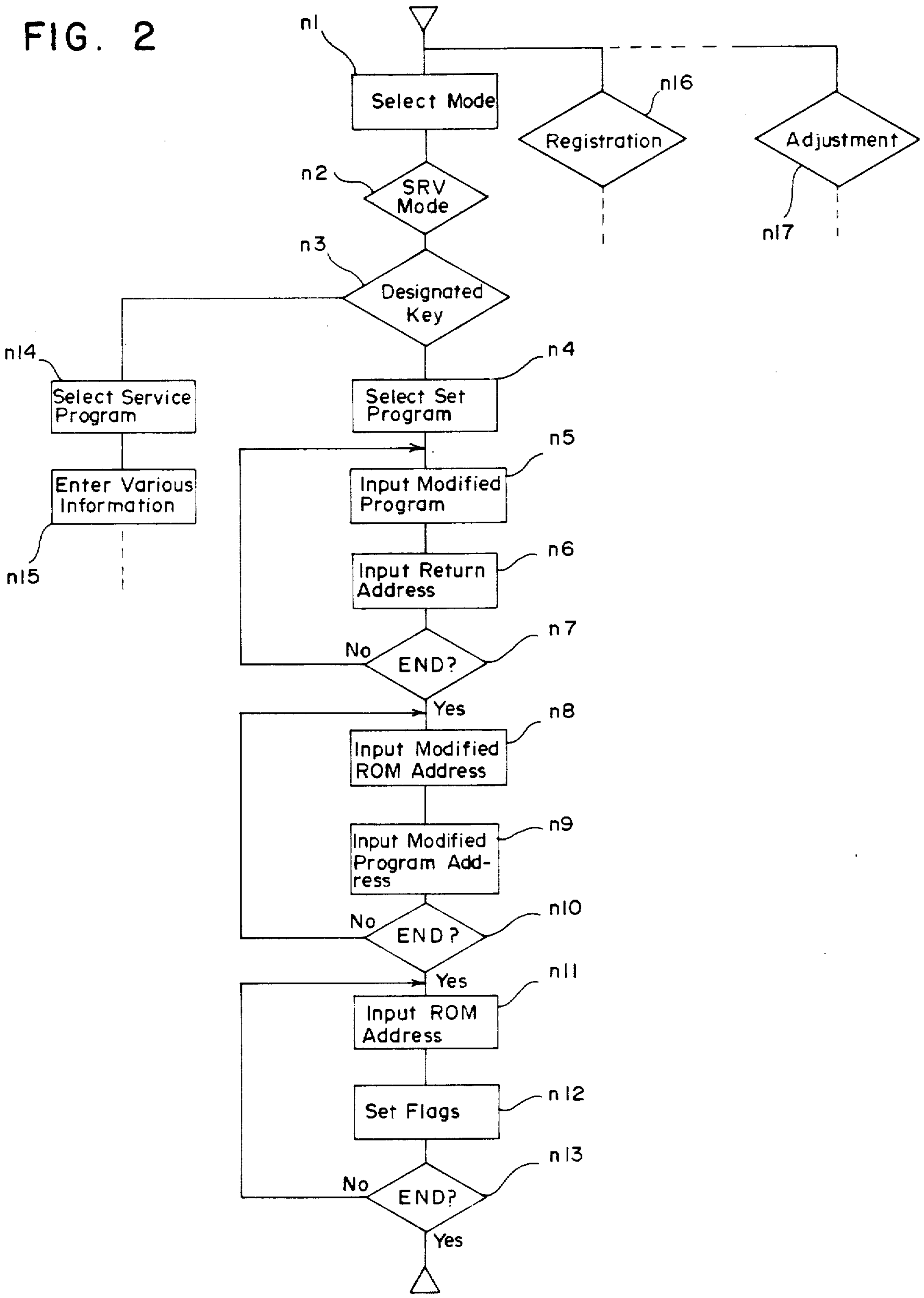
FIG. 2 is an operational flowchart describing the operational procedure for setting modified programs reflecting the preferred embodiments.

Referring now to the attached drawings, one of the preferred embodiments of the present invention is described below.

FIG. 1 is a simplified block diagram of an ECR incorporating the preferred embodiments of the present invention. Reference number 1 indicates the central processing unit (CPU) which is connected to the following devices via data bus 13 and address bus 14, respectively. These devices include the first memory which includes (mask ROM) 2 which permanently stores the various programs needed for processing trading data and for setting modified programs; the second memory (RAM) 3 which contains addresses identical to those of mask ROM 2 and stores such data, indicating against the address positions of mask ROM 2 whether or not the needed program has already been modified, the third memory (RAM) 4 that stores the addresses of the modified program of mask ROM 2 and the next address of the same modified program, bank data denoting the data area storing the modified program, and the modified program itself; means (RAM) 6 for storing the registered and processed data; input means 7 that inputs a variety of trading data and selects any of the mode data denoting registration, inspection, and precise calculation of accounts; display means 8 for displaying input/output data; printer means 9 for printing the input/output data onto receipts; and a drawer 10 that stores cash coming from transactions and registered.

Reference number 11 indicates the decoder that decodes the address data on the address bus 14 in order to select any of the component elements described above. Reference number 12 indicates a flip flop unit, which is activated by signal "1" from RAM 3 and outputs an interruption signal to the CPU 1 on a signal from the activated flip flop 12. Also, in response to the final step of the modified program stored in RAM 4, the activated flip flop 12 detects the position of a modified address in a reset program by a signal from the CPU 1. Reference number 15 indicates the key interface (Key I/F), 16 the printer interface (P I/F), 17 the display interface (D I/F) and 18 the input interface (I/O I/F), respectively.

The first memory has a mask ROM 2 which stores programs available for setting modified programs in area "a". Input means 7 is provided with a group of function keys F including the mode selector M, the designated key "A" and a group of digital keys N.

Referring now to the operational flowchart shown in FIG. 2, the operations necessary for changing or modifying programs in the ECR shown in FIG. 2 are described below. Assume it is necessary to change a program stored in a specific area of the first memory mask ROM 2. The operator first activates a specific mode, for example, service (SRV) mode, by operation the mode selector M of input means 7 (steps n1 and n2), and then presses the designated key "A" (step n3) of the function keys F to selectively designate the program needed for setting the modified program stored in area "a" of the first memory mask ROM 2 (step n4). After selectively designating the required program by operating both the digital keys N and the function keys F, the operator then causes the third memory ROM 4 to store the required program (step n5). (Note that, after selecting the program for setting the modified program, both the digital and function keys of the input means 7 can be made available for designating specific commands for setting the desired programs. Since these keys can be operated in the same manner as any conventional computer capable of entering programs, explanations regarding them are deleted.)

Figure 3:
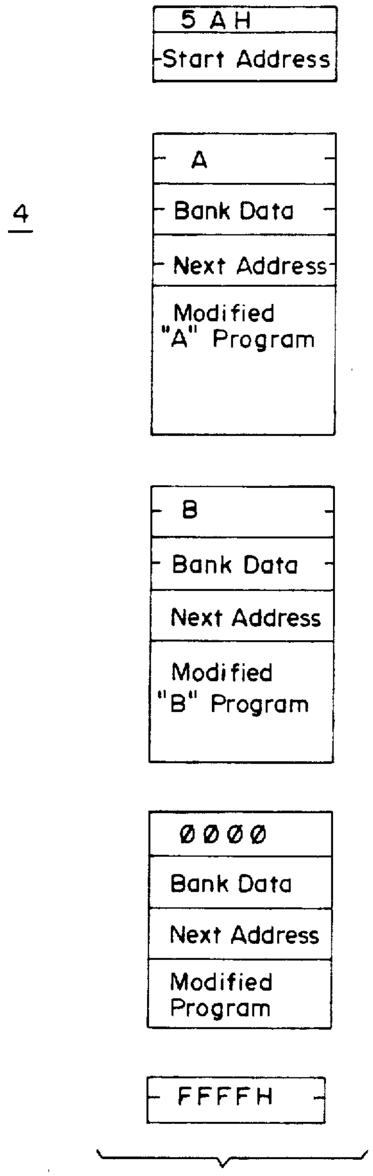

As shown in FIG. 3, the starting address of the modified program is first written into the designated position of the third memory RAM 4, and then sequentially written into the third memory RAM 4 are: address A of the program stored in the first memory mask ROM 2 and requiring change; the data of the memory bank storing the modified program of address A; the address of the program following the modified program stored in the first memory mask ROM 2; and the modified program in address A of the mask ROM 2. In the final step of the modified program, a command for executing a jump to the return address destined for the first memory mask ROM 2 is written into the third memory RAM 4. If any change is to be applied to the program stored in the address B of the first memory mask ROM 2, then, as was done in the above case, data covering address B, the memory bank data, the next address, and the modified program stored in address B of the first memory mask ROM 2, are sequentially written into the third memory RAM 4. When no written modified program is available, data containing the address position matching the program stored in the first memory mask ROM 2 is set to 0000, and then data FFFFH is written into the position at which the modified program is terminated. Next, by operating input means 7, the operator then inputs the address bank data, the next address and the modified program mentioned above (steps n8 and n9). Then, the operator sets flags into the second memory RAM 3 indicating the changes in the programs stored in the first memory for instance ROM 2 (steps n11 through n13). After writing the changed position of the program stored in the first memory mask ROM 2 and the modified program into RAMs 3 and 4 from input means 7, the operator operates the mode selector M for setting the desired position, for example, into the registration mode or the precise calculation mode, before executing the process program of the first memory mask ROM 2.

Figure 5:
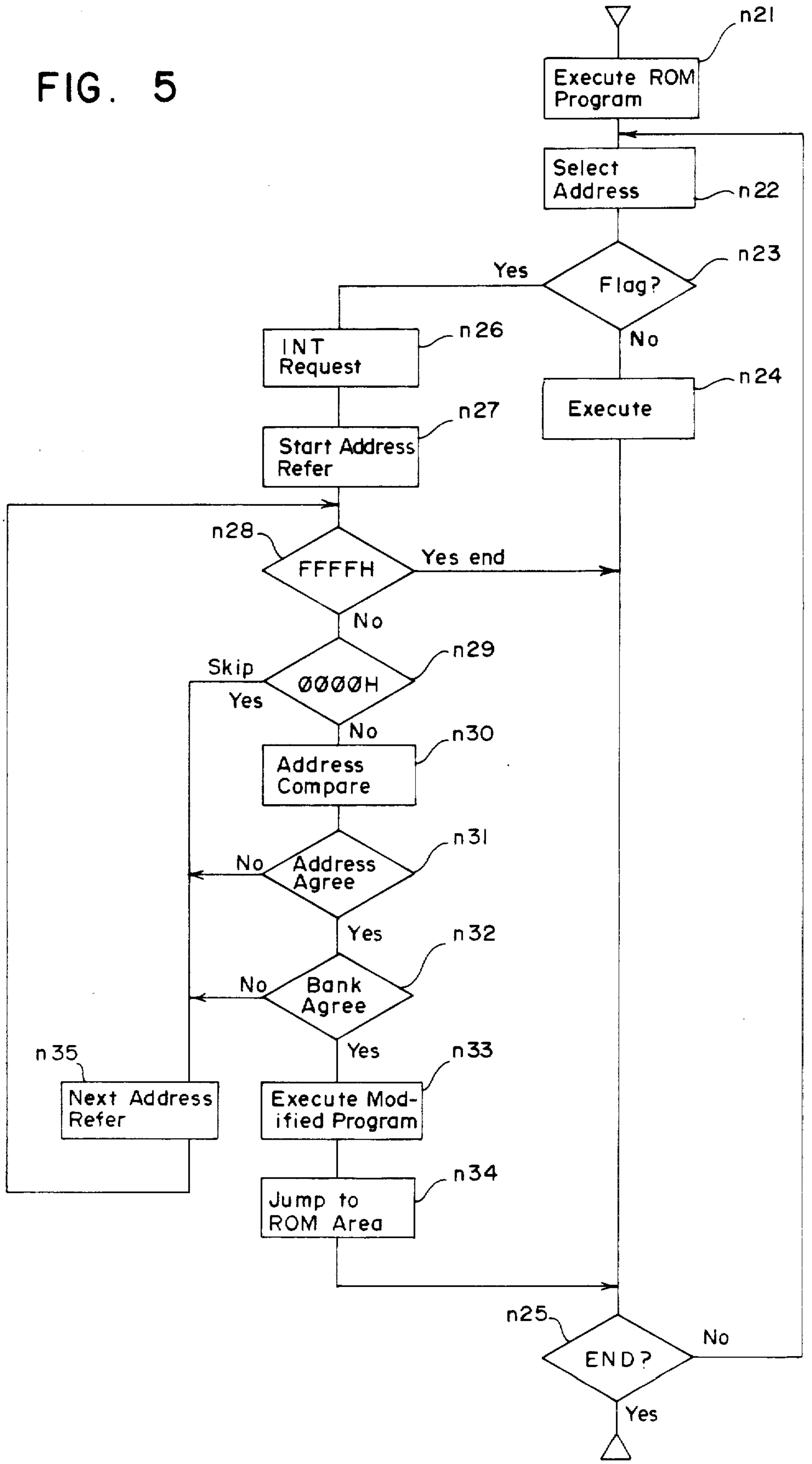
FIG. 5 is an operational flowchart describing the operations needed for executing the modified programs.

Next, referring now to the operation flowchart shown in FIG. 5, the procedure needed for executing programs stored in the first memory mask ROM 2 is described below. When executing this program, the CPU 1 sequentially addresses the first memory mask ROM 2 (steps n21 and n22). As a result, the program stored in the first memory mask ROM 2 is sequentially accessed before the required program is eventually executed (step n24). Simultaneously, since the second memory RAM 3 is also addressed as was done against the first memory mask ROM 2 and receives the address data from the CPU 1, the second memory RAM 3 is addressed synchronous with the first memory mask ROM 2, thus making it possible to read the address position correctly. The second memory RAM 3 stored code "0" while execution those program steps requiring no change or modification and code "1" while program steps requiring any change or modification are underway. While the second memory RAM 3 continues to output code "0", flip flop 12 remains reset, and, as a result, the CPU 1 causes the first memory mask ROM 2 to sequentially proceed through the program steps before the interruption signal from flip flop 12 arrives. When the address position of the first memory mask ROM 2 reaches the address position A at which the program should be changed, the second memory RAM 3 then outputs flag signal "1" so that flip flop 12 can be activated. In other words, flip flop 12 detects that the address position requiring the change of program has been reached by identifying the flag contents stored in the second memory RAM 3 (step n23), and, as a result, flip flop 12 outputs an interruption signal to the CPU 1 to execute an interruption (step n26). In response to the interruption signal thus received, the CPU 1 identifies whether the data is FFFFH or not (step n28) by referring to the starting address of the third memory RAM 4 (step n27). If the data is FFFFH, the modified program is then terminated. If the data is identified as being other than FFFFH, the CPU 1 then identifies whether the data is OOOOH or not (step n29). If the data OOOOH is identified, the CPU 1 activates step n28 by referring to the next address (step n35). Conversely, if the data is other than OOOOH, the CPU 1 temporarily memorizes the present address value A, and then, by referring to the address data stored in the third memory ROM 4, the CPU 1 detects the address position of ROM 4 that stores the modified program matching the temporarily memorized address value A (steps n30 and n31). If these addresses are different from each other, the CPU 1 then causes the operation mode to proceed to step n35. If these addresses correctly match, the CPU 1 then identifies the bank data (step n32). If the bank data are different from each other, the CPU 1 causes the operation mode to proceed to step n35. If these bank data correctly match, the CPU 1 then causes the operation mode to jump onto the position of the modified program before executing the modified program stored in address A of RAM 4 (step n33). The modified program stores a jump command at its final stage to cause the operation mode to again access the address value next to the changed address position of the first memory mask ROM 2. Thus, as soon as the modified program has been fully executed, flip flop 12 is reset, and, at the same time, the operation mode jumps onto the first memory mask ROM 2 (step n34) so that the program of the first memory ROM 2 can be executed again. In the same manner, the CPU 1 causes the program of the first memory mask ROM 2 to be sequentially executed. The next time the address position B requiring any change is reached, flip flop 12 is again activated to generate an interruption signal for delivery to the CPU 1 in order for the modified program correctly matching the address position of the third memory RAM 4 to be executed. Note that, for the purposes of indicating whether any change should be applied to programs or not, the second memory RAM 3 is provided with a plurality of flags at a rate of 1 bit against 1 byte of the first memory ROM 2.

In the operation system thus described, the next address plays the role of linking data between a plurality of modified programs. Therefore, if it is necessary to add any other modified programs, these can easily be added as required by causing the operation mode to transit from the starting address FFFFH to the ensuing addresses in accordance with the operation modes described above. In addition, the operation system described above provides the modified programs with bank data, allowing a comparison of the bank data in the running program with those bank data stored in the modified programs.

This enables the system to correctly modify the required programs by identifying the bank data that has generated the interruption. Referring now to FIG. 4, by setting the bank data at "1" in the area requiring correction, the system allows the modified program to remain effective only when the program runs through the bank 1.

The preferred embodiment of the present invention thus described provides an electronic cash register (ECR) with a variety of uniquely useful devices comprising: addresses identical to those of the first memory ROM that permanently stores a variety of programs relating to the processing of transactions; memory means for storing such data, memorizing whether any change or modification should be applied to programs in these addresses or no; memory means that stores the memory bank data memorizing addresses of the modified programs among those programs stores in the mask ROM and the modified programs themselves; and input means that inputs and processes a variety of trading data by causing the mode selector to select a specific mode without the need to use any program writer independent of the ECR. These unique devices embodied by the present invention have made it possible to easily write and store a variety of data necessary for changing or modifying any program already stored in the mask ROM in respective memory means as described above and, as a result, the preferred embodiment of the present invention securely provides an extremely useful and functional electronic cash register.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electronic cash register for registering and processing a variety of trading data comprising:

first memory means including a plurality of banks each having a series of memory locating for permanently storing processing programs, said memory locations for each of said banks having at least their initial portions in one-to-one correspondence such that a bank having the fewest memory locations has all of said memory locations in one-to-one correspondence with all other banks of said first memory means, each of said banks permanently storing at least a different processing program, said processing programs being used to process said trading data;

second memory means for storing addresses of memory locations of said first memory means which are to be modified, said second memory means consisting of a series of memory locations which are in one-to-one correspondence with the series of memory locations of said first memory means such that the number of memory locations in said second memory means is equal to the number of memory locations in one of said banks of said first memory means having the most memory locations and such that all memory locations of said first memory means are in one-to-one correspondence with said memory locations of said second memory means;

third memory means for storing modifications to said processing programs; and control means for permitting input of said modifications to said third memory means and for reading a selected processing program from at least one of said banks, said control means sequentially reading said corresponding memory locations of said second memory means and said first memory means and upon encountering an address in said second memory means of a memory location of said first memory means to be modified then reading the modification from the third memory means rather than reading said memory location of said first memory means whereby said second memory means is capable of providing addresses of programs to be modified in said first memory means for any of said banks.

2. A method for setting modified programs in an electronic cash register and for processing a variety of trading data comprising the steps of:

permanently storing a plurality of processing programs in a first memory, each of said programs being stored in a separate bank of said first memory and each bank having a series of memory locations, said programs including at least one for registration, inspection and calculation of accounts;

providing a second memory having memory locations having a one-to-one correspondence with each of said memory locations of said first memory and having a total number of memory locations equal to the total number of memory locations in the one bank of said first memory having the most memory locations;

providing a third memory capable of storing modifications for each of said processing programs;

modifying at least one of said processing programs, said modifying comprising the steps of;

determining a bank and an address of said memory location in said first memory to be changed, storing said address in a memory location of said second memory corresponding to said memory location to be changed, and storing said modification in said third memory; selecting a bank to determine which processing program to use;

inputting a variety of trading data; and processing said trading data by said program from said selected bank, said processing comprising the steps of;

sequentially reading the processing program from said first memory by reading with a control device from the memory locations of said first memory as said corresponding memory locations from said second memory are read, continuing reading through said memory locations of said first memory unless an address corresponding to that location is read in said second memory whereupon said modification is read from said third memory rather than reading said memory location of said first memory, and carrying out the steps actually read by said control device on said trading data.

* * * * *